United States Patent
Xu et al.

(10) Patent No.: US 12,363,625 B2
(45) Date of Patent: Jul. 15, 2025

(54) LINK SELECTION FOR AN IDLE OR INACTIVE USER EQUIPMENT

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Longda Xing, San Jose, CA (US); Murtaza A. Shikari, Mountain View, CA (US); Sethuraman Gurumoorthy, San Ramon, CA (US); Sree Ram Kodali, San Jose, CA (US); Srinivasan Nimmala, San Jose, CA (US); Srirang A. Lovlekar, Fremont, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 17/593,579

(22) PCT Filed: Nov. 28, 2019

(86) PCT No.: PCT/CN2019/121550
§ 371 (c)(1),
(2) Date: Sep. 21, 2021

(87) PCT Pub. No.: WO2021/102784
PCT Pub. Date: Jun. 3, 2021

(65) Prior Publication Data
US 2022/0167263 A1 May 26, 2022

(51) Int. Cl.
*H04W 48/18* (2009.01)
*H04W 12/06* (2021.01)
*H04W 36/30* (2009.01)
*H04W 76/19* (2018.01)

(52) U.S. Cl.
CPC .......... *H04W 48/18* (2013.01); *H04W 12/06* (2013.01); *H04W 36/305* (2018.08); *H04W 76/19* (2018.02)

(58) Field of Classification Search
CPC ... H04W 12/06; H04W 36/305; H04W 48/18; H04W 76/19
USPC ....................................................... 370/329
See application file for complete search history.

(56) References Cited

U.S. PATENT DOCUMENTS 10,225,724 B1  3/2019  Pawar et al.
11,219,076 B1 * 1/2022  Marupaduga ........ H04B 7/0447
11,265,702 B1 * 3/2022  Paczkowski ........ H04W 12/041
(Continued)

FOREIGN PATENT DOCUMENTS

CN  103731900  4/2014
CN  106162929  11/2016
(Continued)

*Primary Examiner* — Jean A Gelin
(74) *Attorney, Agent, or Firm* — Fay Kaplun & Marcin, LLP

(57) ABSTRACT

A remote user equipment (UE) configured to access a network via one of a direct link with a base station or a relay link with a relay UE performs a method including receiving link selection criteria, the link selection criteria configured by the network, identifying that the relay UE is available for camping, selecting the relay UE based on the link selection criteria, camping on the relay link corresponding to the relay UE and initiating a network access procedure via the relay link.

18 Claims, 9 Drawing Sheets

(56) References Cited

U.S. PATENT DOCUMENTS

| | | | | |
|---|---|---|---|---|
| 2014/0302774 | A1* | 10/2014 | Burke | G07C 5/08 |
| | | | | 455/3.05 |
| 2015/0063202 | A1* | 3/2015 | Mazzarella | H04L 65/1093 |
| | | | | 370/316 |
| 2017/0111780 | A1* | 4/2017 | Rico Alvarino | H04W 56/001 |
| 2017/0325270 | A1* | 11/2017 | Tenny | H04W 76/14 |
| 2017/0359766 | A1* | 12/2017 | Agiwal | H04L 5/0048 |
| 2018/0123682 | A1* | 5/2018 | Jung | H04W 40/22 |
| 2018/0192461 | A1* | 7/2018 | Naik | H04W 8/24 |
| 2018/0199262 | A1* | 7/2018 | Kuge | H04W 12/06 |
| 2018/0255505 | A1 | 9/2018 | Thyagarajan et al. | |
| 2020/0100174 | A1* | 3/2020 | Kim | H04W 8/20 |
| 2020/0162913 | A1* | 5/2020 | Zhang | H04W 12/069 |
| 2020/0213916 | A1* | 7/2020 | Fang | H04W 8/26 |
| 2021/0013959 | A1* | 1/2021 | Yuan | H04B 7/15571 |
| 2021/0044404 | A1* | 2/2021 | Liu | H04W 72/0446 |
| 2021/0105066 | A1* | 4/2021 | Uchiyama | H04W 88/04 |
| 2021/0176820 | A1* | 6/2021 | Zhang | H04W 8/005 |
| 2021/0243639 | A1* | 8/2021 | Sanaullah | H04B 17/318 |
| 2021/0297842 | A1* | 9/2021 | Shrivastava | H04W 28/24 |
| 2021/0392538 | A1* | 12/2021 | Wang | H04B 7/15528 |
| 2023/0023639 | A1* | 1/2023 | Shi | H04W 88/04 |

FOREIGN PATENT DOCUMENTS

| | | |
|---|---|---|
| CN | 107889080 | 4/2018 |
| CN | 108141775 | 6/2018 |
| EP | 3567924 | 11/2019 |
| WO | 2016/180153 | 11/2016 |
| WO | 2016/185285 | 11/2016 |
| WO | 2018/224128 | 12/2018 |

\* cited by examiner

Scenario 400

Scenario 410

Scenario 420

Scenario 430

LINK SELECTION FOR AN IDLE OR INACTIVE USER EQUIPMENT

BACKGROUND

A user equipment (UE) may establish a connection to at least one of multiple networks or types of networks. In some scenarios, the UE may communicate with the network using a direct communication link to a base station of the corresponding network. In other scenarios, the UE may communicate with the network using a UE to network relay. For example, the UE may establish a direct communication link with a further UE that is camped on a base station of the corresponding network. In this type of arrangement, data and information sent to the network by the UE may initially be transmitted to the further UE and then relayed to the base station by the further UE on behalf of the UE. For downlink communications intended for the UE, data and information may initially be sent to the further UE and then relayed to the UE by the further UE on behalf of the network.

The network may configure the criteria the UE is to utilize for link selection. For example, the UE may initially search for a base station and/or further UE to camp on. The UE may detect multiple base stations and relay UEs available for camping. The UE may then select one of the multiple base stations and relay UEs based on the link selection criteria. Subsequently, the UE may attempt to access the network via the selected base station or further UE.

SUMMARY

Some exemplary embodiments include a method performed by a remote user equipment (UE) configured to access a network via one of a direct link with a base station or a relay link with a relay UE. The method includes receiving link selection criteria, that the link selection criteria configured by the network, identifying the relay UE is available for camping, selecting the relay UE based on the link selection criteria, camping on the relay link corresponding to the relay UE and initiating a network access procedure via the relay link.

Other exemplary embodiments include a remote user equipment (UE) including a transceiver configured to access a network via one of a direct link with a base station or a relay link with a relay UE. The UE also includes a processor that is configured to perform operations including receiving link selection criteria, the link selection criteria configured by the network, identifying that the relay UE is available for camping, selecting the relay UE based on the link selection criteria, camping on the relay link corresponding to the relay UE and initiating a network access procedure via the relay link.

Still further exemplary embodiments include an integrated circuit including circuitry configured to receive link selection criteria, the link selection criteria configured by a network, circuitry configured to identify a relay UE that is available for camping, circuitry configured to select the relay UE based on the link selection criteria, circuitry configured to cause a user equipment (UE) to camp on a relay link corresponding to the relay UE and circuitry configured to initiate a network access procedure via the relay link.

DETAILED DESCRIPTION

Figure 1:
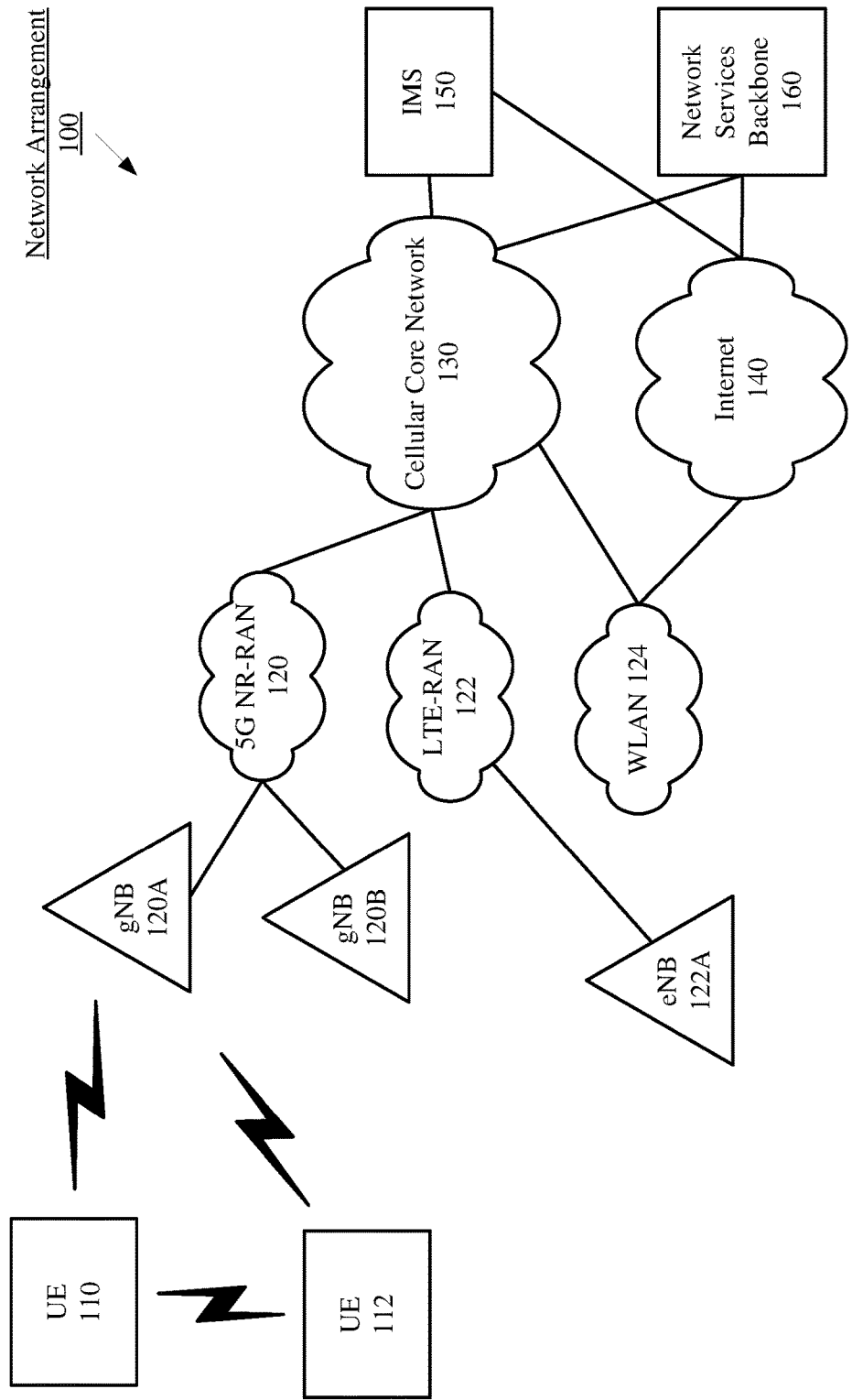
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods to implement various link selection mechanisms. As will be described below, link selection generally refers to selecting a communication link that is to be used to communicate, directly or indirectly, with the network.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

To perform the full scope of functionalities normally available to the UE via a network connection, the UE may directly or indirectly communicate with a base station of the corresponding network. The UE may directly communicate with a currently camped base station. The UE may indirectly communicate with the base station using a UE to network relay. For example, the UE may be configured with a direct communication link to a further UE while the further UE is camped on the base station. In this type of arrangement, the further UE may serve as a relay for the UE. Thus, data and information sent to the network by the UE may initially be transmitted to the further UE and then relayed to the base station by the further UE on behalf of the UE. For downlink communications intended for the UE, data and information may initially be sent to the further UE and then relayed to the UE by the further UE on behalf of the network.

The exemplary embodiments may characterize the UE to network relay as a layer 2 (L2) relay. From the protocol stack perspective, the L2 relay may include one or more layers between the UE and the further UE, one or more layers between the UE and the base station, one or more layers between the UE and the core network, one or more layers between the further UE and the base station and one or more layers between the base station and the core network. However, those skilled in the art would understand that the exemplary embodiments are not limited to a L2 relay and may also apply to a layer 3 (L3) relay or any other appropriate type of relay. Accordingly, throughout this description the term "UE to network relay" may represent any appropriate configuration in which an electronic component (e.g., the further UE) operates as a relay between a UE and a base station.

The exemplary embodiments relate to link selection. Throughout this description, the term "link selection" generally refers to selecting a communication link that the UE is to utilize to access the network. The UE may perform various operations during a link selection procedure such as, but not limited to, searching for a base station or further UE to camp on, collecting measurement data, selecting a communication link, attempting to access the network, etc. However, the criteria utilized by the UE during the link selection procedure may be configured by the network. Throughout this description reference to the network performing an operation may refer to an operation performed at a base station, at a radio access network (RAN), at a core network, at a network function, at a network services backbone, at a network server, any other type of network component or any combination thereof.

To differentiate between UEs, reference will be made to a "remote UE" and a "relay UE." The term "remote UE" may be used to identify a UE that is to operate as a remote endpoint from the base station. The remote UE may connect directly to the base station or indirectly communicate with the base station using a UE to network relay. Throughout this description, the terms UE and remote UE may be used interchangeably. The term "relay UE" may be used to identify a UE that may serve as a relay for the remote UE. The term relay UE is not intended to indicate that the relay UE is actively serving as a relay. Instead, the term relay UE indicates that the UE has the capability of operating as a relay for a remote UE. Further, the relay UE may also be configured as a remote UE simultaneously. Throughout this description, the terms UE, further UE and relay UE may be used interchangeably. However, any reference to a remote UE and a relay UE is merely for illustrative purposes, different networks may refer to similar concepts by a different name.

The exemplary embodiments relate to the remote UE operating in a radio resource control (RRC) idle state or an RRC inactive state. When the remote UE is in the RRC idle state or the RRC inactive state, the remote UE may perform link selection. RRC refers to the radio resource control (RRC) protocols. Those skilled in the art will understand that when the remote UE is in the RRC idle state, the remote UE is not exchanging data with the network and radio resources are not being assigned to the remote UE within the network. However, when the remote UE is operating in the RRC idle state the remote UE may listen for transmissions from the network and/or a relay UE. Those skilled in the art will also understand that when the remote UE is in the RRC inactive state, the remote UE is in a low power mode and is not exchanging data with the network. When the remote UE is in the RRC inactive state, the remote UE may still listen for transmissions from the network and/or a relay UE. The difference between RRC idle state and RRC inactive state is that when the remote UE is in the RRC inactive state, context information may be preserved at the remote UE/network and procedures may be available that allow the remote UE to transition between RRC inactive state and RRC connected state more quickly than the remote UE may transition between RRC idle state and RRC connected.

As mentioned above, the exemplary embodiments relate to link selection. Some exemplary scenarios described below may relate to the remote UE determining whether to camp on a relay UE or a base station, the remote UE determining whether to attempt to access the network via a base station or via a relay UE and the remote UE selecting a different communication link when an attempt to access the network is unsuccessful. As mentioned above, link management may include various operations performed by the remote UE. However, criteria utilized by the remote UE during link selection may be configured by the network.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a mobile phone, a tablet computer, a smartphone, a phablet, an embedded device, a wearable, an Internet of Things (IoT) device, a massive machine-type communication (mMTC) device, etc. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G New Radio (NR) radio access network (5G NR-RAN) 120, a LTE radio access network (LTE-RAN) 122 and a wireless local access network (WLAN) 124. However, the UEs 110, 112 may also communicate with other types of networks and the UEs 110, 112 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. In this example, the 5G NR-RAN 120 is shown with a gNB 120A and a gNB 120B and the LTE-RAN 122 is shown with the an eNB 122A. However, in an actual system arrangement, any appropriate number of cells and base stations may be deployed. The WLAN 124 may include any type of wireless local area network (WiFi, Hot Spot, IEEE 802.11x networks, etc.).

The base stations (e.g., the gNB 120A, the gNB 120B, the eNB 122A) may include one or more communication interfaces to exchange data and/or information with camped UEs, the corresponding RAN, the cellular core network 130, the internet 140, etc. Further, the base stations may include a processor configured to perform various operations. For example, the processor of the base station may be configured to perform operations related to link selection. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the gNB 120B of the 5G NR-RAN 120, the eNB 122A of the LTE-RAN 122).

The UEs 110, 112 may also communicate indirectly with the one or more networks using a UE to network relay. For example, the UE 110 may be a remote UE and the UE 112 may be a relay UE. In this example, the UE 112 may camp on the gNB 120A of the 5G NR-RAN 120 and the UE 110 may camp on the UE 112. Uplink communications from the UE 110 may initially be transmitted over a communication link to the UE 112. Subsequently, the UE 112 may relay the communication to the gNB 120A on behalf of the UE 110. Downlink communication from the gNB 120A to the UE 110 may initially be sent to the UE 112. Subsequently, the UE 112 may relay the communication to the UE 110 on behalf of the gNB 120A. Those skilled in the art would understand that in this example the gNB 120A, the 5G NR-RAN 120 and/or the core network 130 may manage the communication link between the UE 110 and the UE 112.

Throughout this description, the UE 110 may be referenced as a remote UE and the UE 112 may be referenced as a relay UE. However, this is only for illustrative purposes and is not intended to limit the exemplary embodiments in any way.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
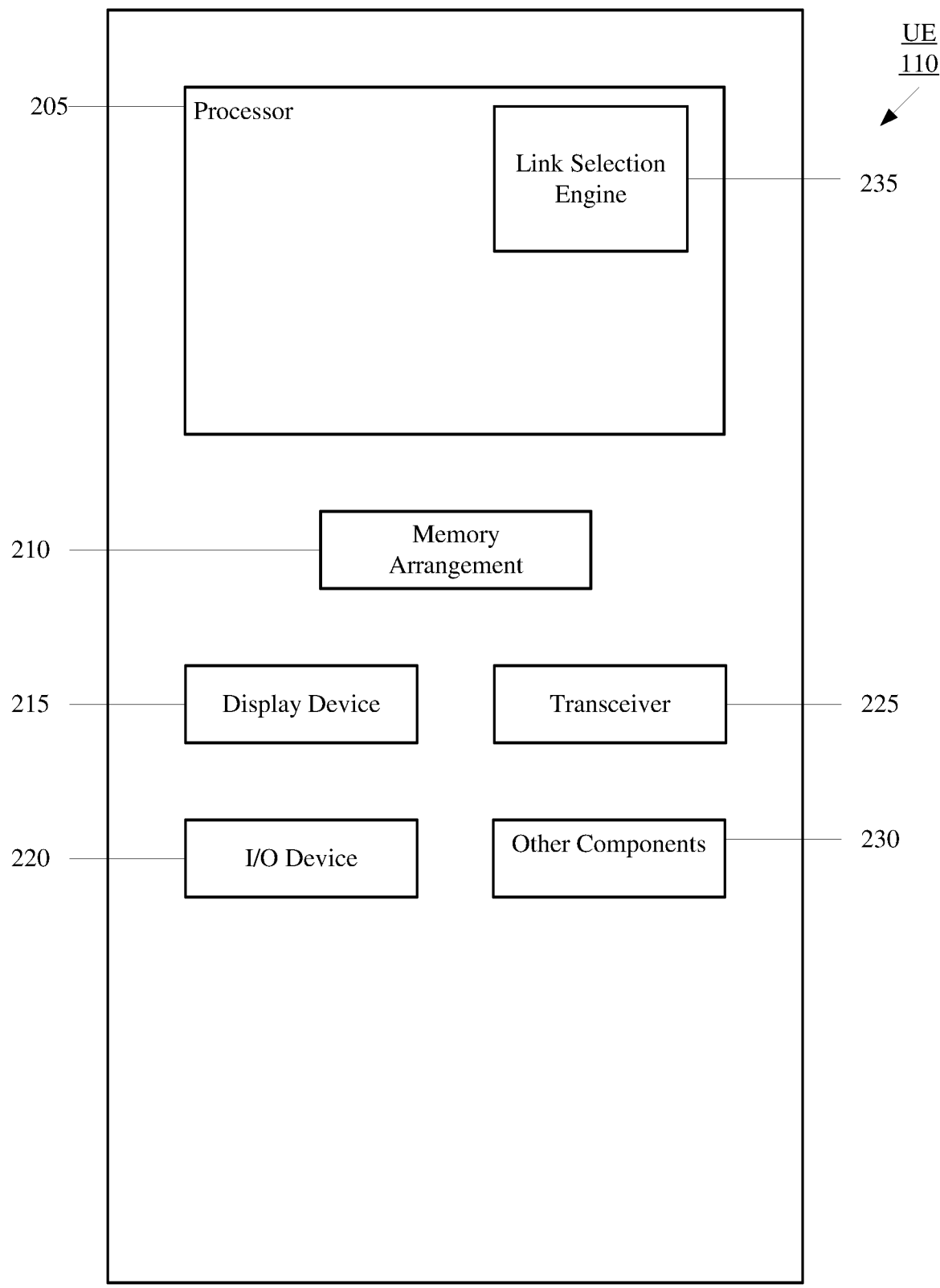
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, a SIM card, an audio input device, an audio output device, a power supply, a data acquisition device, ports to electrically connect the UE 110 to other electronic devices, etc. Those skilled in the art will understand that the UE 110 may represent any electronic component that is capable of operating as a remote UE and/or a relay UE.

The processor 205 may be configured to execute a plurality of engines of the UE 110. For example, the engines may include a link selection engine 235. The link selection engine 235 may perform various operations related to link selection including, but not limited to, managing link selection criteria received from the network, collecting measurement data, selecting a link for camping and selecting a link to utilize for network access.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, the UE 112, etc. Accordingly, the transceiver 225 may operate on a variety of different frequencies or channels (e.g., set of consecutive frequencies).

The UE 110 may be configured to be in one of a plurality of different operating states. One operating state may be characterized as RRC connected state, another operating state may be characterized as RRC idle state and another operating state may be characterized as RRC inactive state. Those skilled in the art will understand that when the UE 110 is in an RRC connected state, the UE 110 may exchange information and/or data with the network. The exchange of information and/or data may enable the UE 110 to perform functionalities available via the network connection. Those skilled in the art will also understand that when the UE 110 is in RRC idle state the UE 110 is not exchanging data with the network and radio resources are not being assigned to the UE 110 within the network. However, when the UE 110 is in the RRC idle state the UE 110 may listen for transmissions from the network or a relay UE. Like the RRC idle state, when the UE 110 is in the RRC inactive state the UE 110 is not exchanging data with the network, however, the UE 110 may still listen for transmissions from the network or a relay UE. The difference between RRC idle state and RRC inactive state is that for RRC inactive state some context information may be preserved at the UE 110/network and procedures may be available that allow the UE 110 to transition between RRC inactive state and RRC connected state more quickly than the remote UE may transition between RRC idle state and RRC connected state.

When deployed within the network, the UE 110 may transition between operating states. For example, the UE 110 may be camped on a base station of a corresponding network or a relay UE and experience a connection issue. Subsequently, the UE 110 may transition from the RRC connected state or the RRC inactive state to the RRC idle state. At this point, the UE 110 is still camped on the base station but is now in the RRC idle state. When the UE 110 is in the RRC idle state, the UE 110 may not be able to exchange data with the network. To exchange data with the network, the UE 110 may transition from the RRC idle state to the RRC connected state. Specifically, while in RRC idle state the UE 110 may listen for information such as but not limited to, primary synchronization signals (PSS) and secondary synchronization signals (SSS), Master Information Block (MIB), broadcast messages, System Information Block (SIB), paging notifications etc. In response, the UE 110 may issue a request to the network that indicates that the UE 110 wants to be moved to the RRC connected state. A successful transition from the RRC idle state to the RRC connected state may include the exchange of messages between the UE 110 and a base station (directly or indirectly via a UE to network relay). In the RRC connected state, a network context may be established between the network and the UE 110. Thus, the UE 110 may be assigned radio resources and the UE 110 may be able to exchange data with the network.

When the UE 110 is in the RRC connected state, the UE 110 may transition to the RRC inactive state. As mentioned above, the RRC inactive state is a low power mode and is not used to exchange data with the network. However, context is preserved at the UE 110/network that would allow the UE 110 to quickly transition back to the RRC connected state. The scenario described above is only intended to provide a general example of the UE 110 transitioning between the RRC connected state, RRC idle state and RRC inactive state. The exemplary embodiments described below relate to the UE 110 performing link selection while operating in the RRC idle state or the RRC inactive state.

As mentioned above, the remote UE 110 may camp on a base station (e.g., the gNB 120A, the gNB 120B) or a relay UE (e.g., the UE 112). Those skilled in the art would understand that the interface between the 5G NR-RAN 120 and the UE 110 may be referred to as a Uu interface. Throughout this description, a direct communication link between a UE and a base station of the 5G NR-RAN 120 may be referred to as a "Uu link." Further, the term "relay link" may refer to a communication link with a relay UE that is may be used by the remote UE to indirectly communicate with the network.

Figure 3:
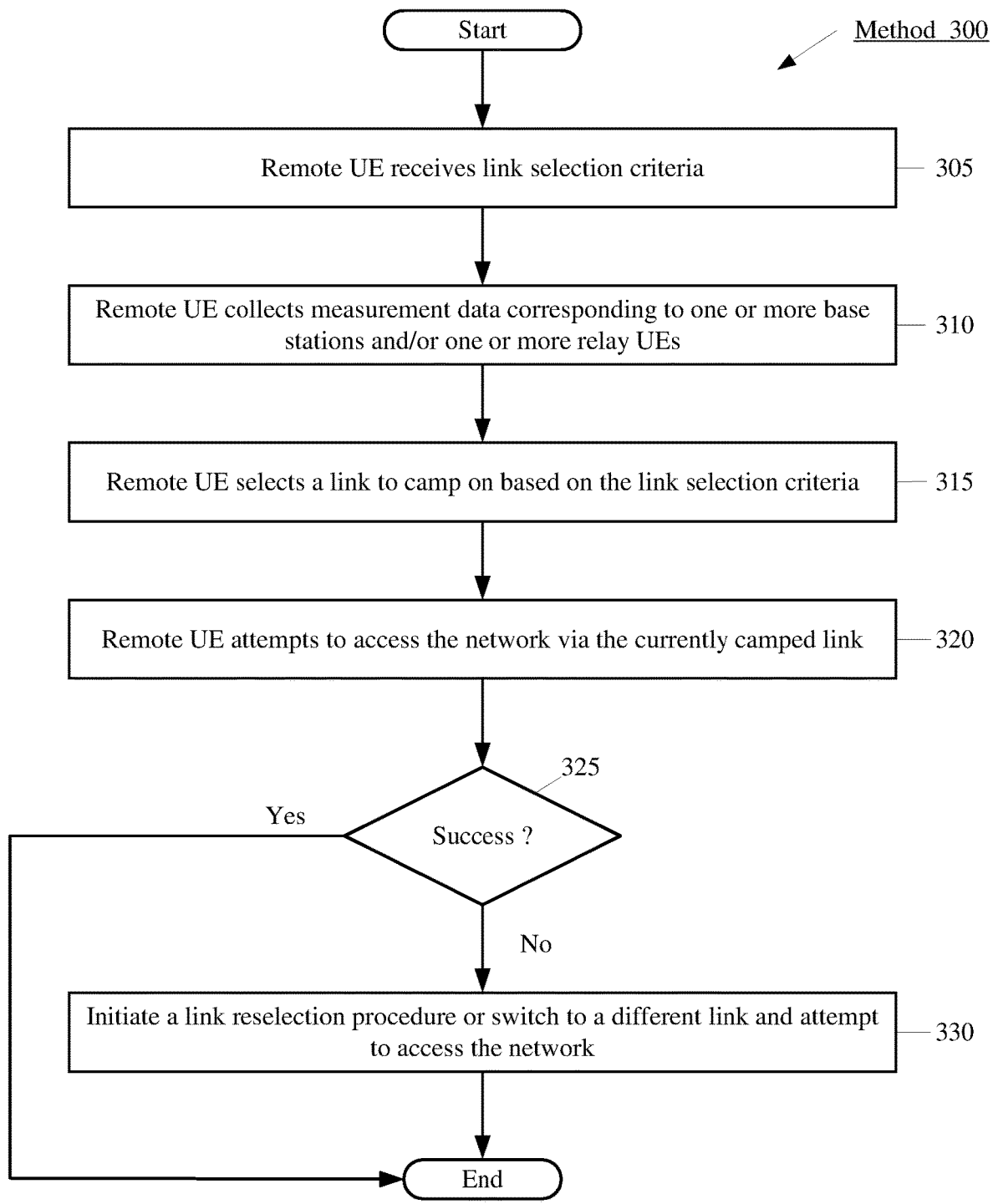
FIG. 3 shows a method for link selection according to various exemplary embodiments.

FIG. 3 shows a method 300 for link selection according to various exemplary embodiments. The method 300 will be described with regard to the network arrangement 100 of FIG. 1 and the UE 110 of FIG. 2.

In 305, the remote UE 110 receives link selection criteria. The link selection criteria may include various rules for link selection. The exemplary embodiments are described with regard to the link selection criteria being configured on the network side and then being provided to the remote UE 110. However, the exemplary embodiments are not limited to link selection criteria being configured on the network side. The exemplary embodiments may apply to scenarios in which the link selection criteria is configured by the UE itself or configured by a source outside of the network (e.g., manufacturer, software developer, user, etc.).

When the link selection criteria is configured on the network side, the link selection criteria may be provided to the remote UE 110 in any of a variety of different ways. For example, the link selection criteria may be included in an RRC procedure, transmitted to the remote UE 110 over a dedicated communication link, included in a broadcast, included in configuration information, included in a software update, included in carrier settings, included in a tracking area update (TAU) procedure, included in a routing area update (RAU) procedure or may be provided to the remote UE 110 in any other appropriate manner.

The remote UE 110 may store the link selection criteria in the memory arrangement 210. Thus, the link selection criteria provided by the network does not have to be provided to the remote UE 110 every time the remote UE 110 is configured to perform link selection. Instead, the network may pre-configure the remote UE 110 with the link selection criteria so the link selection criteria can be utilized even when the remote UE 110 is out of coverage.

The link selection criteria may include any of a variety of different rules. For example, the link selection criteria may include rules related to quality criteria, link based priority, service based priority, device type priority and permitted relay UEs.

The quality criteria may relate to the quality of a potential communication link. For example, the quality criteria may include a threshold value related to link quality. If measurement data satisfies the quality threshold, the remote UE may camp on the corresponding base station or relay UE. The threshold value may be applicable to a link type, one or more frequency bands, one or more base stations and one or more relay UEs. Thus, the remote UE 110 may be configured with multiple thresholds and reference a particular threshold value when it is relevant to the current scenario.

The link based priority may indicate whether the remote UE 110 is to prioritize a certain type of link (e.g., a Uu link over a relay link or vice versa). The remote UE 110 may be configured to always prioritize a certain link type or the remote UE 110 may be configured to prioritize a Uu link over a relay link under a first set of conditions and prioritize a relay link over a Uu link under a second set of conditions.

The service based priority may indicate whether the remote UE 110 is to prioritize a link based on the type of services (e.g., voice, data, etc.) that the link is capable of providing. The remote UE 110 may be configured to always prioritize a certain service type or the remote UE 110 may be configured to prioritize a first one or more service types under a first set of conditions and prioritize a second one or more service types under a second set of conditions.

The device type priority may relate to the type of remote UE 110 that is to utilize the link selection criteria. For example, a wearable type of remote UE and a smart phone type of remote UE may each be configured with different link selection criteria. Thus, a first type of UE may be configured to perform link selection in a first manner and a second type of UE may be configured to perform link selection in a second manner.

The link selection criteria may also indicate that the remote UE 110 is permitted to camp on certain relay UEs. For example, the link selection criteria may include one or more relayIDs where each relayID identifies a particular relay UE. If a relayID is provided to the remote UE 110, the remote UE 110 may be permitted to camp on the relay UE associated with the relayID. If a relayID is not provided to the remote UE 110, the remote UE 110 may not be permitted to camp on the relay UE. Alternatively, if the relayID is not provided, the remote UE may request to connect to a relay UE or attempt to authenticate with the relay UE. Thus, camping on a relay link may be based on whether an authentication procedure in which the relay UE and/or the network permit the remote UE 110 to camp on the relay link. An example of an authentication procedure is described below with regard to FIGS. 5*a*-5*b*.

In 310, the remote UE 110 collects measurement data corresponding to one or more base stations and/or one or more relay UEs. The measurement data may indicate to the remote UE 110 whether the corresponding base station or relay UE is suitable for camping. For example, when the remote UE 110 is in the idle state or the inactive state, the remote UE 110 may tune its transceiver 225 to various frequency bands to search for base stations and relay UEs that the remote UE 110 may camp on. The remote UE 110 may collect measurement data for any detected base stations and/or relay UEs. For base stations, the remote UE 110 may collect measurement data corresponding to the Uu interface. For relay UEs, the remote UE 110 may collect measurement data corresponding to the relay link. This measurement data may relate to layer 1 (L1), layer 3 (L3) or any other appropriate aspect of wireless communications. When the remote UE 110 is in the idle state or the inactive state, the remote UE 110 may be configured to collect this measurement data periodically in accordance with a schedule or timer. The remote UE 110 may also be configured to collect this measurement data based on the occurrence of a predetermined condition.

In 315, the remote UE 110 selects a link to camp on based on the link selection criteria. For example, the remote UE 110 may apply the link selection criteria to the set of suitable base stations and relay UEs detected in 310. As a result, the remote UE 110 may camp on a relay link of a relay UE, camp on a Uu link of a base station or camp on both a relay link and a Uu link. As will be described below, the remote UE 110 may attempt to access the network on the camped link. An example of how the remote UE 110 may utilize the link selection criteria to select a link is described below with regard to the method 600 of FIG. 6.

Figure 4A:
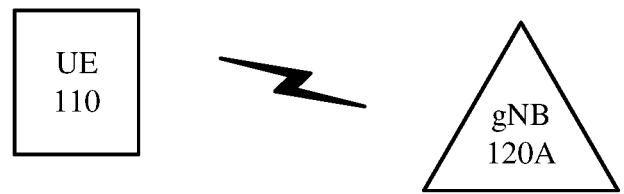
FIGS. 4a-4d each show an exemplary scenario related to the remote UE camping on a selected link.

FIGS. 4*a*-4*d* each show an exemplary scenario related to the remote UE 110 camping on a selected link. FIG. 4*a* shows a scenario 400 in which the remote UE 110 is camping on the gNB 120A. When camped on the gNB 120A, the remote UE 110 may receive paging information and system information from the gNB 120A via a Uu link. In this arrangement, the remote UE 110 may also attempt to access the network via the Uu link with the gNB 120A.

Figure 4B:
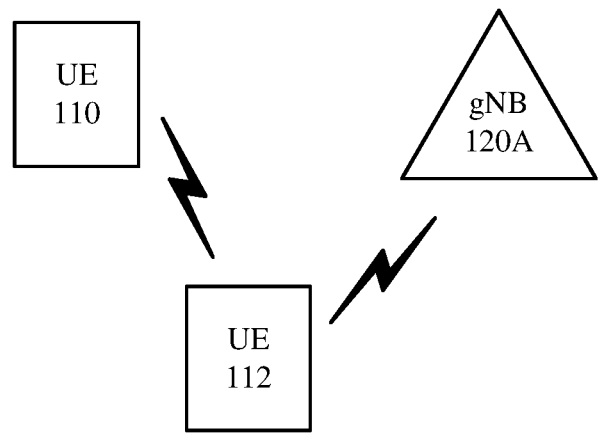

FIG. 4*b* shows a scenario 410 in which the remote UE 110 is camping on the relay UE 112. When camped on the relay UE 112, the remote UE 110 may receive paging information and system information from the network via the relay link with the relay UE 112. In this arrangement, the remote UE 110 may also attempt to access the network via the relay link with the relay UE 112.

Figure 4C:
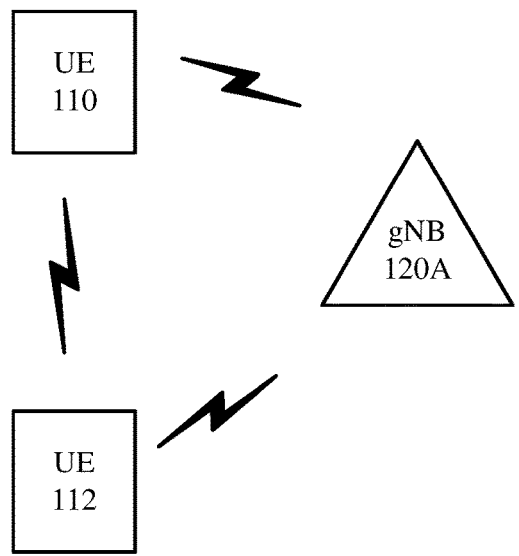

FIG. 4*c* shows a scenario 420 in which the remote UE 110 is camping on both the gNB 120A and the relay UE 112. In this arrangement, the remote UE 110 may decide whether to utilize the gNB 120A or the relay UE 112 for paging and system information acquisition. The remote UE 110 may make this determination on any appropriate basis. The remote UE 110 may utilize the selected one of the gNB 120A and the relay UE 112 to attempt to access the network.

Figure 4D:
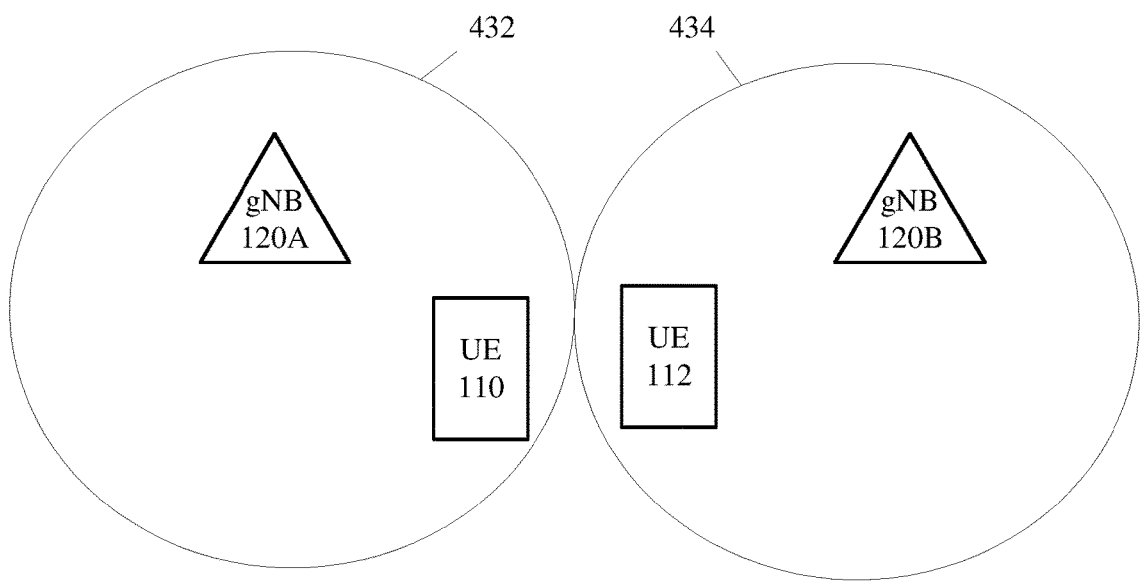

FIG. 4*d* shows a scenario 430 in which the remote UE 110 is within the coverage area 432 of the gNB 120A and not within the coverage area 434 of the gNB 120B. In the scenario 430, the relay UE 112 is within the coverage area 410 of the gNB 120B. In this type of arrangement, the remote UE 110 may select the Uu link of the gNB 120A for camping. The remote UE 110 may also select the relay link of the relay UE 112 for camping. Thus, a UE to network relay may enable the remote UE 110 to communicate with a base station even when the remote UE 110 is not within the coverage area of that base station.

In the scenario 430, the remote UE 110 may select one of the Uu link with the gNB 120A or the relay link with the relay UE 112 for camping. To provide an example, if the link selection criteria indicates that a Uu link is to be prioritized over a relay link, the remote UE 110 may be configured to only select a relay UE for camping that is within the coverage area of the same base station. Thus, in this example, the remote UE 110 may not select the relay UE 112 for camping. To provide another example, if the link selection criteria indicates that a relay link is to be prioritized over a Uu link, the remote UE 110 may be configured to camp on a relay UE regardless of whether the remote UE and the relay UE are within the coverage area of the same base station. Thus, in this example, the remote UE 110 may select the relay UE 112 for camping. The above described scenarios and examples are only provided for illustrative purposes and are not intended to limit the exemplary embodiments in any way.

Returning to the method 300, in 320, the remote UE 110 may attempt to access the network via the currently camped link. For example, if the remote UE 110 selects to camp on the relay link of the relay UE 112 in 315, the remote UE 110 may attempt to access the network via the relay link. If the remote UE 110 selects to camp on the Uu link of the gNB 120A in 315, the remote UE 110 may attempt to access the network via the Uu link. To access the network, the remote UE 110 may perform various operations including, but not limited to, downlink synchronization, uplink synchronization, a random access (RA) procedure, establishing a dedicated connection, etc. However, the exemplary embodiments are not limited to accessing the network in any particular way and may apply to the remote UE 110 utilizing any appropriate access mechanisms.

In 325, the remote UE 110 determines whether the attempt to access the network via the currently camped link was successful. If the attempt was successful, the method 300 may end and the remote UE 110 may perform the full scope of functionalities normally available to the UE 110 via a network connection. If the attempt was unsuccessful, the method 300 may continue to 330.

In 330, the remote UE 110 may initiate a link reselection procedure or switch to a different link and once again attempt to access the network.

As mentioned above, the remote UE 110 and the relay UE 112 may participate in an authentication procedure to determine whether the remote UE 110 is permitted to camp on the relay link of the relay UE 112. An example of an authentication procedure is shown below in FIGS. 5*a*-5*b*.

Figure 5A:
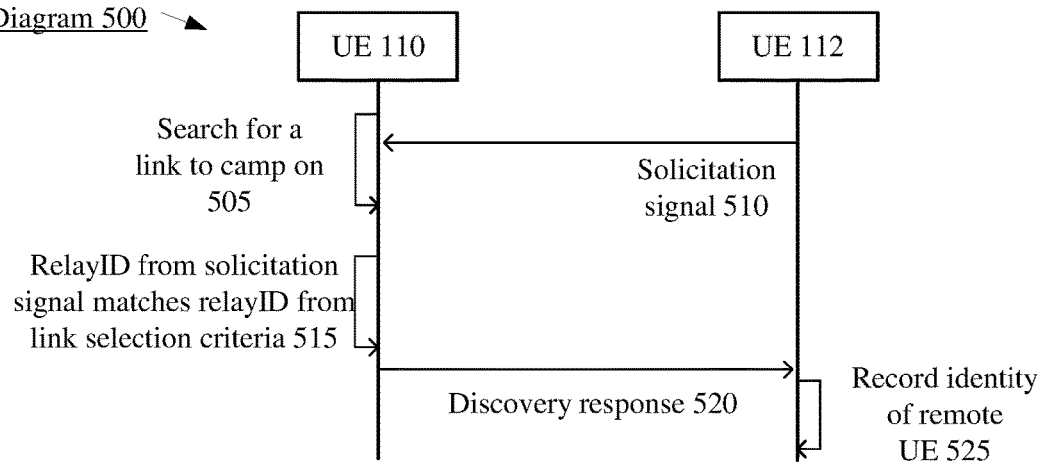
FIGS. 5a-5b each show an exemplary signaling diagram related to an authentication procedure for camping on a relay link.
Figure 5B:
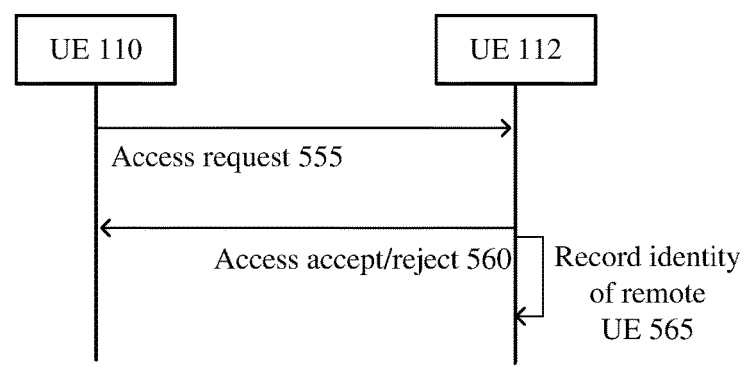

FIGS. 5*a*-5*b* each show an exemplary signaling diagram related to an authentication procedure for camping on a relay link. FIG. 5*a* shows a signaling diagram 500 between the remote UE 110 and the relay UE 112. In 505, the remote UE 110 searches for a link to camp on. During the search, the relay UE 112 may be detected by the remote UE 110. For instance, in 510, the relay UE 112 may broadcast a solicitation signal. The solicitation signal may indicate to the remote UE 110 that the relay UE 112 is capable of providing a relay link and may include a relayID and a cell ID corresponding to the base station the relay UE 110 is camped on.

In 515, the remote UE 110 determines whether the remote UE 110 is permitted to camp on the relay UE 112 by referencing a set of relayIDs stored at the remote UE 110. For example, the remote UE 110 may have received a set of relayIDs that the remote UE 110 is permitted to camp on in the link selection criteria. If the relayID included in the solicitation signal matches a relayID included in the link selection criteria, the remote UE 110 may camp on the relay UE 112.

In 520, the remote UE 110 may transmit a discovery response to the relay UE 112. The discovery response may indicate to the relay UE 112, that the remote UE 110 is permitted to camp on the relay UE 112. In 525, the relay UE 112 may record the identity of the remote UE 110.

FIG. 5b shows a signaling diagram 550 between the remote UE 110 and the relay UE 112. In 555, the remote UE 110 transmits an access request to the relay UE 112. In 560, the relay UE 112 may transmit an access accept message to the remote UE 110 if the relay UE 112 determines that the remote UE 110 is permitted to camp on the corresponding relay link. Alternatively, in 560, the relay UE 112 may transmit an access reject message to the remote UE 110 if the relay UE 112 determines that the remote UE 110 is not permitted to camp on the corresponding relay link. Thus, in the signaling diagram 550, the relay UE 112 explicitly indicates to the remote UE 110 whether the remote UE 110 is permitted to camp on the corresponding relay link.

In 565, the relay UE 112 may record the identity of the remote UE 110. The signaling diagrams 500, 550 are only intended to provide examples of an authentication procedure between the remote UE 110 and the relay UE 112 and are not intended to limit the exemplary embodiments in any way. Those skilled in the art will understand that any appropriate authentication procedure may be implemented.

Figure 6:
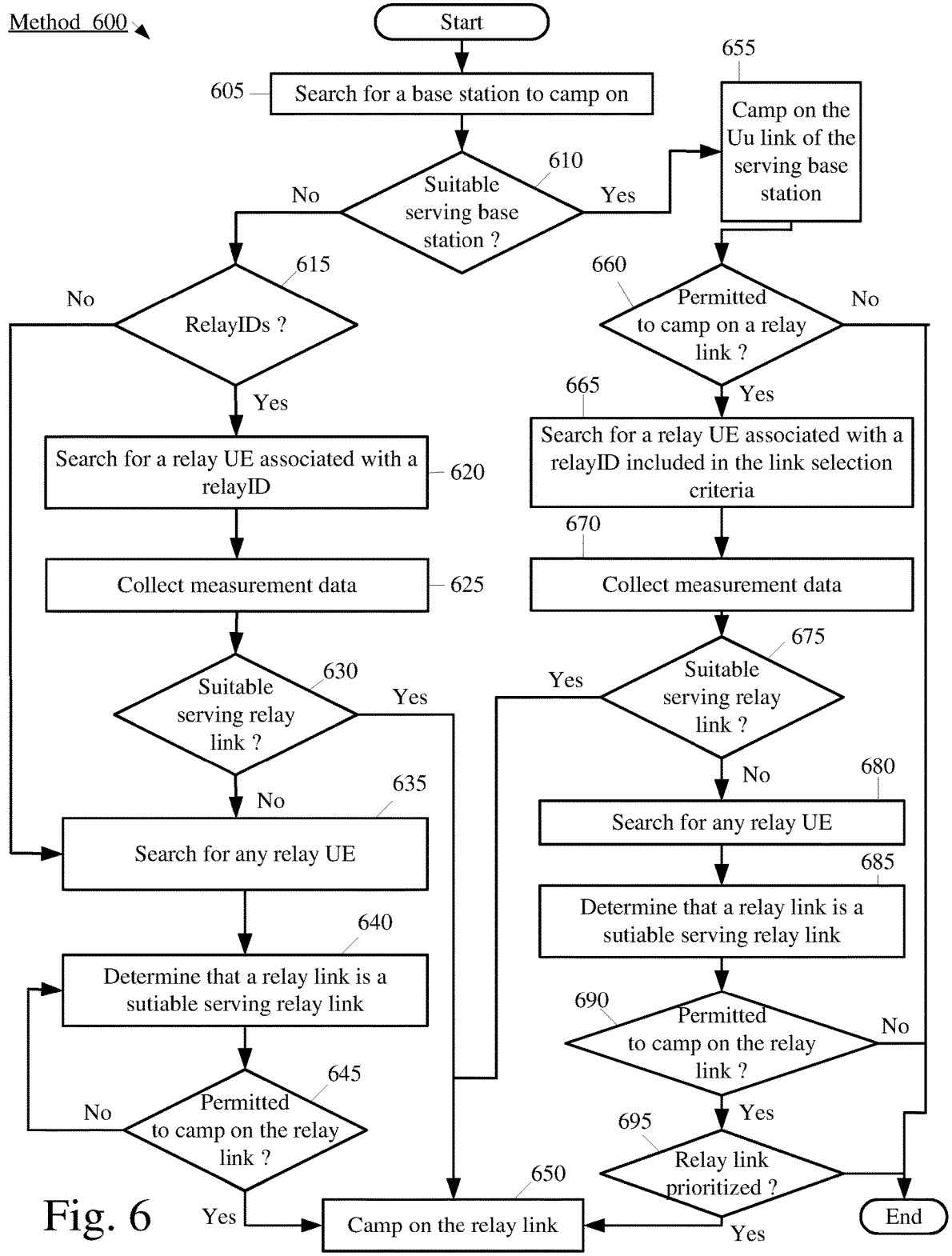
FIG. 6 shows a method for selecting a link based on link selection criteria according to various exemplary embodiments.

FIG. 6 shows a method 600 for selecting a link based on link selection criteria according to various exemplary embodiments. The method 600 will be described with regard to the network arrangement 100 of FIG. 1, the UE 110 of FIG. 2 and the method 300 of FIG. 3.

As mentioned above with regard to 315 of the method 300, during a link selection procedure, the remote UE 110 may select a link to camp on using link selection criteria configured by the network. The method 600 provides an example of how the remote UE 110 may select a link to camp on using, at least in part, the link selection criteria. However, the link selection criteria may be configured by the network in any of a variety of different ways. Thus, the method 600 provides a general example of selecting a link using link selection criteria and is not intended to limit the exemplary embodiments to the link selection criteria described with regard to the method 600. The exemplary embodiments may apply to link selection criteria configured by the network in any suitable manner.

In 605, the remote UE 110 searches for a base station to camp on. For example, the remote UE 110 may tune the transceiver 225 to various frequency bands. During the search, the remote UE 110 may collect measurement data corresponding to potential serving base stations. The remote UE 110 may also include information from base stations that is to be used to determine whether the corresponding link is suitable for camping.

In 610, the remote UE 110 determines whether a base station detected in 605 may be a suitable serving base station. For example, measurement data corresponding to a base station may be compared to a threshold value. If the measurement data satisfies the threshold, this may indicate to the remote UE 110 that the corresponding base station may be a suitable serving base station. Alternatively, the remote UE 110 may be out of coverage and thus, a base station may not be detected in 605. However, the above example is only provided for illustrative purposes, the remote UE 110 may make this determination in any appropriate manner.

If the remote UE 110 determines that there is no suitable serving base station, the remote UE 110 is out of coverage and thus, the remote UE 110 may search for a relay link to camp on. The search for a relay link will be described below with regard to 615-650.

In 615, the remote UE 110 determines whether the remote UE 110 has been provided relayIDs in previously received link selection criteria. As mentioned above, the remote UE 110 may receive a set of link relayIDs that the remote UE 110 is permitted to camp on in the link selection criteria. The link selection criteria may be stored in the memory arrangement 210 and available for scenarios in which the remote UE 110 is out of coverage. As will be explained below, the relayIDs included in the link selection criteria may not be the only relay UEs the remote UE 110 is permitted to camp on.

If the remote UE 110 does not have access to a set of relay IDs from link selection criteria, the method 600 continues to 635. If the remote UE 110 has access to relayIDs from the link selection criteria, the method 600 continues to 620. In 620, the remote UE 110 searches for relay UEs associated with the relay IDs included in the link selection criteria. In 625, the remote UE 110 collects measurement data for any relay UEs detected in 620 to determine the quality of the corresponding relay links.

In 630, the remote UE 110 determines whether a relay link associated with a relayID included in the link selection criteria may be a suitable serving relay link. For example, the measurement data may be compared to a quality criteria threshold. However, this example is only for illustrative purposes, the remote UE 110 may make this determination in any appropriate manner.

If the remote UE 110 determines that a relay link associated with a relayID included in the link selection criteria is a suitable serving relay link, the method 600 continues to 650 where the remote UE 110 camps on the relay link.

If the remote UE 110 determines that a relay link associated with a relayID included in the link selection criteria is not a suitable serving relay link, the method 600 continues to 635.

In 635, the remote UE 110 searches for any relay UE to camp on. In 640, the remote UE 110 determines that a relay link identified in 635 may serve as a suitable serving relay link.

In 645, the remote UE 110 may determine whether the remote UE 110 is permitted to camp on the relay link determined to be a suitable serving relay link. For example, the remote UE 110 and the relay UE corresponding to this relay link may participate in an authentication procedure (e.g., signaling diagrams 500, 550 or any other suitable procedure.) If the remote UE 110 is not permitted to camp on this relay UE, the method 600 returns to 640. If the remote UE 110 is permitted to camp on this relay UE, the method 600 continues to 650. In 650, the remote UE 110 camps on the relay UE. Subsequently, the method 600 ends.

Returning to 610, if a base station is determined to be a suitable serving base station, the method 600 continues to 655. In 655, the remote UE 110 camps on the Uu link of the serving base station. When camped on the serving base station, the remote UE 110 may receive link selection criteria or the remote UE 110 may have previously received link selection criteria. The link selection criteria may be implemented while the remote UE 110 is camped on the base station.

In 660, the remote UE 110 determines whether the remote UE 110 is permitted to camp on a relay link. If the remote UE 110 is not permitted to camp on a relay link, the method 600 ends with the remote UE 110 camped on the Uu link of the serving base station. If the remote UE 110 is permitted to camp on a relay link, the method 600 continues to 665.

In 665, the remote UE 110 searches for a relay UE corresponding to a relayID included in the link selection criteria. In 670, the remote UE 110 collects measurement data corresponding to any relay UEs detected in 665.

In 675, the remote UE 110 determines whether a relay link corresponding to a relayID included in the link selection criteria may be a suitable relay serving link. If the remote UE 110 determines that there is a suitable relay serving link, the method 600 continues to 650 where the remote UE 110 camps on the relay link. If the remote UE 110 determines that there is no suitable relay serving link, the method 600 continues to 680.

In 680, the remote UE 110 searches for any relay UE to camp on. In 685, the remote UE 110 determines that a relay link identified in 680 may serve as a suitable serving relay link. In 690, the remote UE 110 determines whether the remote UE 110 is permitted to access this relay link. For example, the remote UE 110 and the relay UE corresponding to this relay link may participate in an authentication procedure (e.g., signaling diagrams 500, 550 or any other suitable procedure). If the remote UE 110 is not permitted to access the relay link, the method 600 ends with the remote UE 110 camped on the Uu link of the serving base station. If the remote UE 110 is permitted to access this relay link, the method 600 continues to 695.

In 695, the remote UE 110 determines whether a relay link is prioritized over a Uu link. For example, in the link selection criteria, the network may indicate that relay links are to be prioritized over Uu links or vice versa.

If a relay link is prioritized, the method 600 continues to 650 where the remote UE 110 camps on the relay link. If the relay link is not prioritized, the method 600 ends with the remote UE 110 camped on the Uu link of the serving base station.

Figure 7:
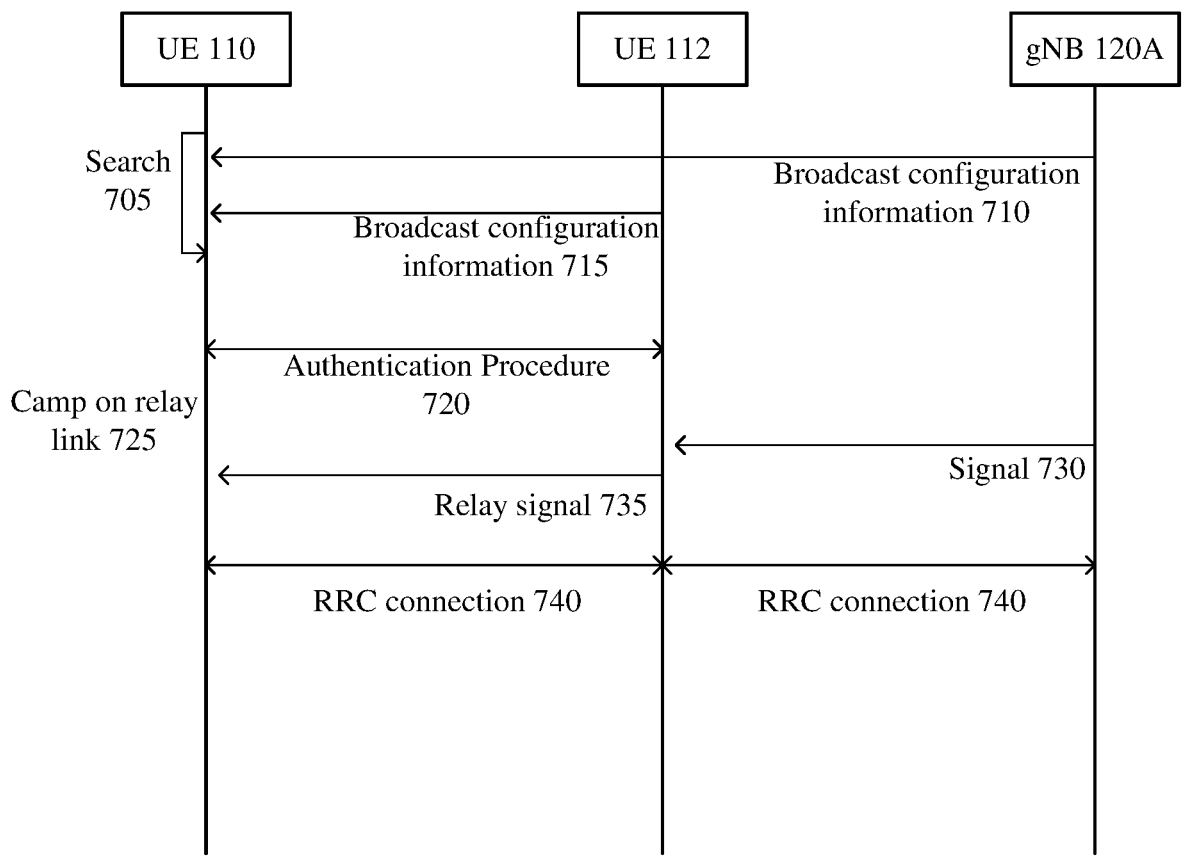
FIG. 7 shows a signaling diagram related to when the remote UE may initiate link selection.

FIG. 7 shows a signaling diagram 700 related to when the remote UE 110 may initiate link selection. The signaling diagram 700 will be described with regard to the network arrangement 100 of FIG. 1, the UE 110 of FIG. 2 and the method 300 of FIG. 3.

The signaling diagram 700 includes the remote UE 110, the relay UE 112 and the gNB 120A. Initially, the remote UE 110 is not camped on either the relay UE 112 or the gNB 120A and is in the RRC idle state. Thus, a link selection procedure is initiated prior to camping on a link.

In 705, the remote UE 110 searches for base stations and relay links to camp on. During the search, the remote UE 110 may collect measurement data to determine whether a base station or relay UE detected in the search may provide a suitable serving link.

In 710, the gNB 120A may broadcast configuration information to the remote UE 110. This configuration information may include link selection criteria. In this example, the link selection criteria may indicate to the remote UE 110 that the remote UE 110 is permitted to camp on the relay UE 112 and a relay link is to be prioritized over a Uu link. The gNB 120A may perform the broadcast during the search in 705.

In 715, the relay UE 112 may broadcast configuration information. This configuration information indicates to the remote UE 110 that the relay UE 112 is within the proximity of the remote UE 110. The relay UE 112 may perform the broadcast during the search in 705. Thus, during the search 705 the remote UE 110 may have received configuration information from both the relay UE 112 and the gNB 120A.

In 720, the remote UE 110 and the relay UE 112 perform an authentication procedure. In 725, the remote UE 110 camps on the relay link of the relay UE 112. As mentioned above, in this example, a relay link is prioritized over a Uu link and thus, the remote UE 110 selects the relay link of the relay UE 112 for camping.

When camped on the relay link, the remote UE 110 is configured to receive signals from the gNB 120A via the relay link. Thus, in 730, the gNB 120A transmits a signal to the remote UE 110. The signal may be broadcast information, system information, paging or any other appropriate type of information that may be received by the remote UE 110 while the remote UE 110 is in the RRC idle state (or RRC inactive state).

Since the remote UE 110 is camped on the relay link of the relay UE 112, the signals sent to the remote UE 110 by the gNB 120A in 730 are initially sent to the relay UE 112. In 735, the relay UE 112 relays the signal to the remote UE 110 on behalf of the gNB 120A.

In 740, the remote UE 110 initiates an RRC procedure to transition from the RRC idle state to the RRC connected state. Thus, an RRC connection is established and the remote UE 110 is able to access the network via the relay link.

Figure 8:
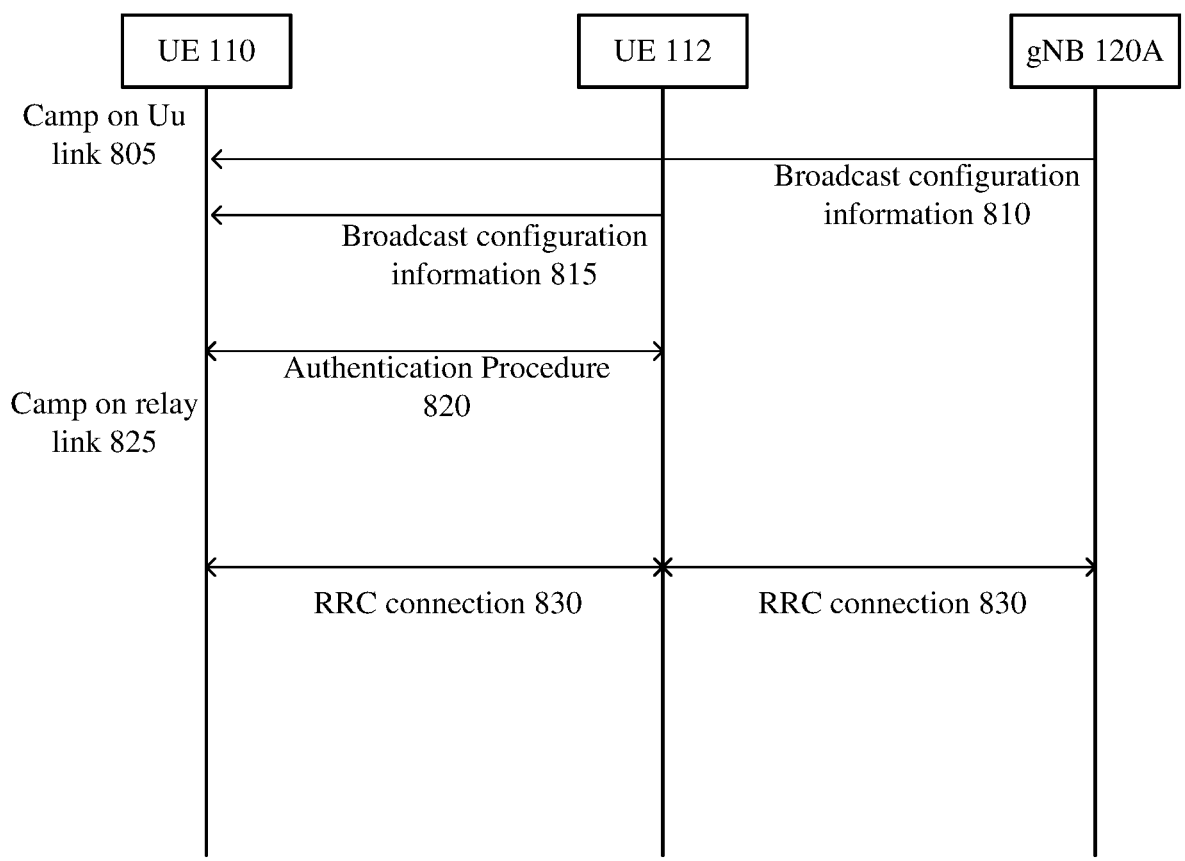
FIG. 8 shows a signaling diagram related to when the remote UE may initiate link selection.

FIG. 8 shows a signaling diagram 800 related to when the remote UE 110 may initiate link selection. The signaling diagram 800 will be described with regard to the network arrangement 100 of FIG. 1, the UE 110 of FIG. 2 and the method 300 of FIG. 3.

The signaling diagram 800 includes the remote UE 110, the relay UE 112 and the gNB 120A. Initially, in 805, the remote UE 110 is camped on the Uu link of the gNB 120A. Thus, a link selection procedure is initiated when the remote UE 110 is camped on a link.

In 810, the gNB 120A may broadcast configuration information to the remote UE 110. This configuration information may include link selection criteria. In this example, the link selection criteria may indicate to the remote UE 110 that the remote UE 110 is permitted to camp on the relay UE 112 and a relay link is to be prioritized over a Uu link. The gNB 120A may perform the broadcast while the remote UE 110 is camped on the Uu link of the gNB 120A.

In 815, the relay UE 112 may broadcast configuration information. This configuration information indicates to the remote UE 110 that the relay UE 112 is within the proximity of the remote UE 110. The relay UE 112 may perform the broadcast during the search in 705. Thus, while the remote UE 110 is camped on the Uu link of the gNB 120A, the remote UE 110 may have received configuration information from both the relay UE 112 and the gNB 120A.

In 820, the remote UE 110 and the relay UE 112 perform an authentication procedure. In 825, the remote UE 110 camps on the relay link of the relay UE 112. As mentioned above, in this example, a relay link is prioritized over a Uu link and thus, the remote UE 110 selects the relay link of the relay UE 112 for camping.

In 830, the remote UE 110 initiates an RRC procedure to transition from the RRC idle state to the RRC connected state. Thus, an RRC connection is established and the remote UE 110 is able to access the network via the relay link.

If the remote UE 110 is unable to access the network via the selected link, the remote UE 110 may perform link selection and attempt to access the network via the selected link. Thus, the remote UE 110 may attempt to access the network on a relay link or a Uu link. Alternatively, the remote UE 110 can directly select another type of link, if the link is a suitable serving link, and attempt to access the network via the selected link. Thus, the remote UE 110 may attempt to access the network using a type of link that was not used in the previous unsuccessful attempt. For example, if the remote UE 110 was unable to establish the RRC connection using the relay link in the signaling diagrams 700, 800, the remote UE 110 may attempt to establish the RRC connection using the Uu link of the gNB 120A.

If the remote UE 110 is currently camped on a Uu link of a first base station (e.g., gNB 120A) and then moves to the coverage area of a second base station (e.g., gNB 120B), a link selection procedure may be initiated. Thus, if the second base station allows the remote UE 110 to access the network via a relay link, the remote UE 110 may perform a search and attempt to access the network using a relay UE within the coverage area of the second base station.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method comprising:
   at a remote user equipment (UE) configured to access a network via one of a direct link with a base station or a relay link with a relay UE:
   receiving link selection criteria, the link selection criteria configured by the network, wherein the link selection criteria includes a relayID associated with the relay UE;
   identifying one or more UEs available for camping;
   selecting a relay UE from the one or more relay UEs based on the link selection criteria;
   camping on the relay link corresponding to the relay UE; and
   initiating a network access procedure via the relay link.

2. The method of claim 1, further comprising:
   identifying the base station that is available for camping;
   determining that the network access procedure via the relay link has failed;
   selecting the base station in response to determining that the network access procedure via the relay link has failed;
   camping on the direct link corresponding to the base station; and
   initiating the network access procedure via a Uu link.

3. The method of claim 1, wherein the link selection criteria indicates that the relay link is to be prioritized.

4. The method of claim 1, wherein identifying that the relay UE is available for camping includes receiving the relayID associated with the relay UE in a signal broadcast by the relay UE and wherein selecting the relay UE based on the link selection criteria includes identifying that the relayID included in the link selection criteria and the relay ID received in the broadcast from the relay UE are the same.

5. The method of claim 1, wherein the link selection criteria includes rules related to one or more of link quality, link based priority, service based priority and device type priority.

6. The method of claim 1, further comprising:
   performing a link authentication procedure with the relay UE, the link authentication procedure comprising:
   transmitting an access request to the relay UE; and
   receiving an access request accept message from the relay UE.

7. The method of claim 1, further comprising:
   performing a link authentication procedure with the relay UE, the link authentication procedure comprising:
   receiving a signal from the relay UE, the signal including the relayID associated with the relay UE;
   determining that the relayID included in the signal received from the relay UE matches a relayID stored on the remote UE.

8. The method of claim 7, the authentication procedure further comprising:
   transmitting a discovery response to the relay UE.

9. The method of claim 1, wherein selecting the relay link occurs when the remote UE is camped on the direct link of the base station.

10. The method of claim 1, wherein selecting the relay link occurs when the remote UE is not camped on any link.

11. A remote user equipment (UE), comprising:
    a transceiver configured to access a network via one of a direct link with a base station or a relay link with a relay UE; and
    a processor, the processor configured to perform operations comprising:
    receiving link selection criteria, the link selection criteria configured by the network, wherein the link selection criteria includes a relayID associated with the relay UE;
    identifying one or more UEs available for camping;
    selecting the relay UE from the one or more UEs based on the link selection criteria;
    camping on the relay link corresponding to the relay UE; and
    initiating a network access procedure via the relay link.

12. The remote UE of claim 11, the operations further comprising:
    identifying the base station that is available for camping;
    determining that the network access procedure via the relay link has failed;
    selecting the base station in response to determining that the network access procedure via the relay link has failed;
    camping on the direct link corresponding to the base station; and
    initiating the network access procedure via a Uu link.

13. The remote UE of claim 11, wherein the link selection criteria indicates that the relay link is to be prioritized.

14. The remote UE of claim 11, wherein the link selection criteria includes rules related to one or more of link quality, link based priority, service based priority and device type priority.

15. An integrated circuit, comprising:
circuitry configured to receive link selection criteria, the link selection criteria configured by a network, wherein the link selection criteria includes a relayID associated with the relay UE;
circuitry configured to identify one or more UEs available for camping;
circuitry configured to select the relay UE from the one or more UEs based on the link selection criteria;
circuitry configured to cause a user equipment (UE) to camp on a relay link corresponding to the relay UE; and
circuitry configured to initiate a network access procedure via the relay link.

16. The integrated circuit of claim 15, wherein the link selection criteria includes rules related to one or more of link quality, link based priority, service based priority and device type priority.

17. The integrated circuit of claim 15, wherein identifying that the relay UE is available for camping includes receiving the relayID associated with the relay UE from the relay UE and wherein selecting the relay UE based on the link selection criteria includes identifying that the relayID included in the link selection criteria and the relayID received from the relay UE are the same.

18. The integrated circuit of claim 15, wherein selecting the relay link occurs i) when a remote UE is camped on a Uu link of a base station or ii) when the remote UE is not camped on any link.

* * * * *